June 7, 1966  G. GIACOMELLO  3,255,387
SEALED CAPACITOR AND METHOD OF ASSEMBLING SAME
Filed April 21, 1961

INVENTOR
Giacomo Giacomello
BY Connolly and Hutz
ATTORNEYS

United States Patent Office 3,255,387
Patented June 7, 1966

3,255,387
SEALED CAPACITOR AND METHOD OF ASSEMBLING SAME
Giacomo Giacomello, Milan, Italy, assignor, by mesne assignments, to Sprague Electric Company, North Adams, Mass., a corporation of Massachusetts
Filed Apr. 21, 1961, Ser. No. 104,581
Claims priority, application Italy, Apr. 27, 1960, Patent 627,731
5 Claims. (Cl. 317—230)

This invention relates to an electrolytic capacitor and to a method of making the same, and more particularly to a closure for a dry electrolytic capacitor and a method of producing the closure.

The term "dry electrolytic capacitor" as used in this invention relates to a capacitance section having one or more oxide coated or "formed" electrodes which are convolutely wound with an additional common electrode and porous spacer material to prevent shorting of adjacent electrodes. This capacitance section is impregnated with a paste-like (dry) electrolyte usually comprising a glycol-borate system.

The dry electrolytic capacitance section of the prior art is conventionally housed within a metal can-type container having an internal ledge adjacent its open end. The typical closure of the art utilizes a multilayer seal having a compressible member which is forcibly engaged against the inside wall of the container. Terminals are provided for the formed electrodes by bringing a tab from each electrode through a slot in the multilayer cover to join an external connector. It is customary in the art to terminate the common electrode by a pressure contact which consists of forcing a tab from the common electrode into contact with the can wall and the mounting ring, by means of the cover member. The sealing of the open end of the container is produced by rolling the lip of the container onto the metallic mounting ring to compress the cover against the internal ledge in the container, and the resilient member against the container wall. A typical dry electrolyte capacitor of prior art construction is shown in FIG. 2 of U.S. 2,202,166.

Although the above-described dry electrolytic capacitor has been found to be generally acceptable to the electronic industry, the construction suffers disadvantages with respect to reproducibility due to the in-situ assembly and production of the closure and the resulting non-uniform electrical contact of the common electrode to the mounting ring. The closure of the prior art, including the electrical contact between the common electrode tab and the mounting ring, is dependent on the rolling of the container lip; any variation or fault in the rolling operation produces a loose seal and a poor electrical contact.

It is an object of this invention to provide a capacitor construction and method that overcomes the disadvantages of the prior art.

It is a further object of this invention to provide a capacitor construction and method that produces a capacitor closure which effectively seals the container and provides an improved electrical contact.

These and other objects of this invention will become apparent upon consideration of the description and claims taken together with the accompanying drawing, in which:

Figure 1:
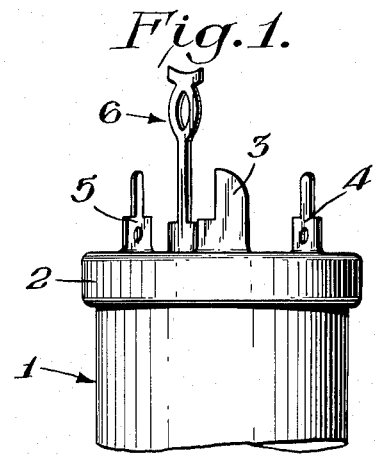
FIG. 1 shows a side view of an end of a capacitor constructed according to this invention.

In general, the objects of this invention are obtained by providing a closure member that is completely assembled prior to being sealed in the mouth of a container.

More particularly, the objects of this invention are attained by uniting the individual elements of a closure member, including the electrical contact between the common capacitor electrode and the mounting ring, into a single assembly which is then secured to a capacitance section prior to positioning the total assembly in the mouth of the capacitor container and sealing by rolling the lip of the container onto the mounting ring.

The drawing shows a generally cylindrical metal container 1 having an enlarged upper end 2 to provide an internal ledge near the open mouth of the container. It is this ledge that provides the seat for the closure member shown in FIG. 2. FIG. 3 shows the closure member of FIG. 2 assembled and positioned on the internal ledge in sealing relationship to the container by means of the rolled-over lip of the container bearing against the closure member.

In the interests of clarity of expression, the closure member is shown as having a mounting ring with only three mounting prongs, and the capacitance section is shown as having only a single terminal. It should be understood by those skilled in the art that it is common to have as many as four mounting prongs. The terminals and mounting prongs shown in the drawing are constructed to provide a capacitor capable of being utilized in both a wired circuit and a printed wiring board, as set forth in detail by May and Kalker in U.S. Letters Patent 3,014,195, issued December 19, 1961.

Figure 2:
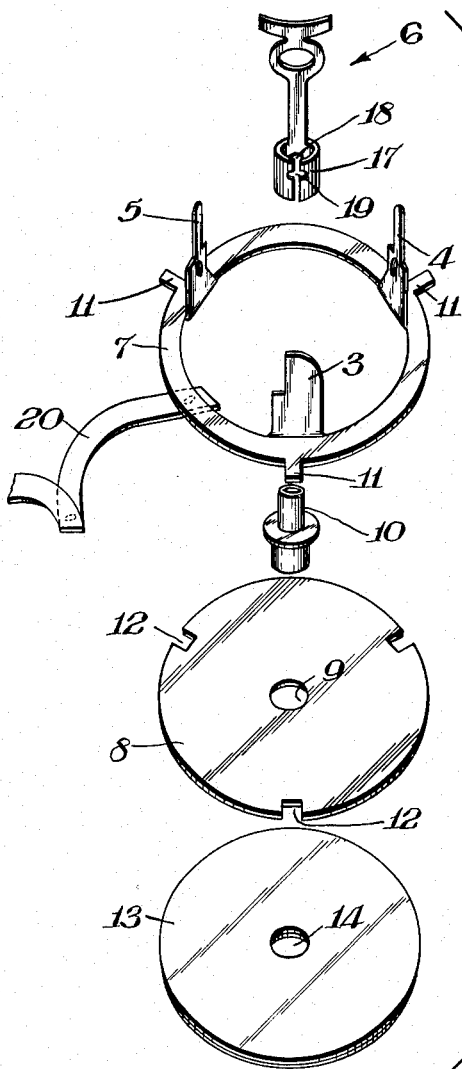
FIG. 2 is a perspective view in exploded fashion of the individual elements of the closure according to this invention.
Figure 3:
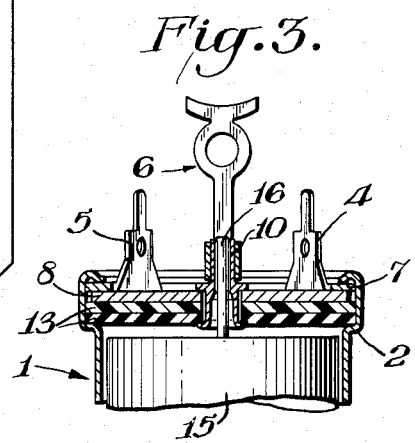
FIG. 3 is a cross-section of FIG. 1 showing the completed closure of FIG. 2.

The closure member shown in FIG. 2 comprises a mounting ring 7 carrying mounting prongs 3, 4, and 5. The electrical connection from the common electrode of capacitance section 15 is shown as a two-piece tab 20 which is welded at one extremity to mounting ring 7. The preferred embodiment of this invention utilizes two-piece tab 20 for convenience in assembling the capacitor. However, it should be understood that a one-piece tab 20 may be utilized with one end of the tab welded to mounting ring 7 and the other end welded or otherwise secured to the common electrode of capacitance section 15.

Mounting ring 7 with welded tab 20 is then secured to rigid disc 8 of insulating material by securing lugs 11 of ring 7 in notches 12 on disc 8. Insulating disc 13 is of two-part construction; one part being of rigid plastic material, and the other part being of resilient rubber-like material. The subassembly of mounting ring 7, welded tab 20, and insulating disc 8 is joined to insulating disc 13 by means of a tubular rivet 10 which passes through suitable openings 9 and 14 in discs 8 and 13. Rivet 10 is provided with an external shoulder which is seated on the upper surface of disc 8 by the operation of spinning the lower end of the rivet into the resilient layer of disc 13 to compress the discs into a unitary assembly.

Capacitance section 15 is joined to the assembled closure member of FIG. 2 by welding tab 20 to the tab extending from the common electrode of the capacitance section. A lead 16 extending from each of the formed electrodes of capacitance section 15 is passed through its individual rivet 10. External terminal member 6 has a base 17 which provides two ears that are curved to fit around rivet 10. Lead 16 and terminal 6 are fixedly engaged on rivet 10 by means of suitable pressure to provide a cold-welded assembly. Small openings 18 and 19 in the base of terminal 6 facilitate the cold-welding operation by providing ports into which the deformed material of lead 16 and eyelet 10 may enter. The deformation of eyelet 10 in the cold-welding operation seals the eyelet 10 to lead 16, and imprisons terminal 6 on the eyelet. This is a true seal that requires no solder or other means to enhance the contact resistance.

Capacitance section 15, with the assembled closure member of FIG. 2 affixed to the capacitance section by a plurality of cold-welded leads 16 and eyelets 10 and welded tab 20, is then positioned in container 1 with the resilient member of disc 13 resting on the internal ledge of the container. In this regard it should be noted that the resilient member of disc 13 may have a slightly greater diameter than mating discs 8 and 13 to resiliently engage the container wall. Spacer members, such as plastic spiders, may be inserted within container 1 at the top and bottom of section 15 to enhance the vibration resistance of the assembled capacitor. The lip of container 1 is then spun over onto mounting ring 7 which serves as a pressure plate to exert compression on the closure member to effectively seal container 1.

As many apparently widely different embodiments of this invention may be made without departing from the spirit and scope hereof, it is to be understood that the invention is not limited to the specific embodiments hereof except as defined in the appended claims.

I claim:

1. A method of producing a capacitor closure member comprising first joining a conductive tab to a conductive mounting ring, then joining said ring at spaced points to a rigid insulating member, and thereafter joining said member to additional insulating layers by a connecting device that provides a passage through said member and said layers.

2. A method of producing a capacitor comprising first welding a conductive tab to a conductive mounting ring, then joining said ring to a plurality of insulating discs by providing a passage means through said discs, thereafter securing a lead from a capacitance section in said passage and electrically connecting a terminal to said lead, welding a second lead from said capacitance section to said tab, providing a container with an internal ledge, positioning said capacitance section in said container with said discs seated on said ledge, and pressing the lip of said container against said mounting ring.

3. An integral capacitor closure assembly comprising a mounting ring having a conductive tab joined thereto, a rigid insulating disc joined to said mounting ring by mechanical interengagement therewith, and a resilient insulating disc joined to said rigid disc by terminal mounting means passing through both said discs.

4. An integral capacitor closure assembly as defined in claim 3 wherein said mechanical interengagement of said mounting ring and said rigid disc includes a plurality of lugs depending from said mounting ring and secured into a plurality of mating slots in said rigid disc.

5. A capacitor comprising a container, a capacitance section within said container, and an integral plural-layer closure assembly sealing an end of said container, said capacitance section having a pair of electrodes, a conductive lead secured to each of said electrodes, said closure member having a mounting ring integral with a rigid insulating disc and a resilient insulating disc, one of said leads joined to said mounting ring, said rigid insulating disc joined to said mounting ring by mechanical interengagement therewith, said resilient insulating disc joined to said rigid disc by terminal mounting means passing through both said discs, and the other of said leads joined to said terminal mounting means.

References Cited by the Examiner

UNITED STATES PATENTS

| 2,225,801 | 12/1940 | Schnoll | 317—230 |
| 2,569,925 | 10/1951 | Deeley | 317—230 |
| 2,602,832 | 7/1952 | Brennan | 317—230 |
| 2,627,538 | 2/1953 | Brennan | 317—230 |
| 2,776,467 | 1/1957 | Brennan | 317—230 |

JOHN W. HUCKERT, *Primary Examiner.*

GEORGE N. WESTBY, *Examiner.*

J. D. KALLAM, *Assistant Examiner.*